(12) United States Patent
Fiderer et al.

(10) Patent No.: US 11,451,848 B2
(45) Date of Patent: Sep. 20, 2022

(54) MEDIAHUB FOR CONTROLLING AND MONITORING THE DISTRIBUTION OF TARGETED ASSETS

(71) Applicant: INVIDI Technologies Corporation, Princeton, NJ (US)

(72) Inventors: Howard Fiderer, Princeton Junction, NJ (US); Daniel C. Wilson, Edmonton (CA)

(73) Assignee: INVIDI Technologies Corporation, Princeton, NJ (US)

( * ) Notice: Subject to any disclaimer, the term of this patent is extended or adjusted under 35 U.S.C. 154(b) by 0 days.

(21) Appl. No.: 16/592,405

(22) Filed: Oct. 3, 2019

(65) Prior Publication Data

US 2021/0227278 A1  Jul. 22, 2021

Related U.S. Application Data

(60) Provisional application No. 62/742,107, filed on Oct. 5, 2018.

(51) Int. Cl.
*H04N 21/2668* (2011.01)
*H04N 21/24* (2011.01)
*H04N 21/658* (2011.01)
*H04N 21/81* (2011.01)

(52) U.S. Cl.
CPC ..... *H04N 21/2668* (2013.01); *H04N 21/2407* (2013.01); *H04N 21/6582* (2013.01); *H04N 21/812* (2013.01)

(58) Field of Classification Search
CPC ........... H04N 21/2668; H04N 21/2407; H04N 21/6582; H04N 21/812; H04N 21/23424; H04N 21/252; H04N 21/2547; H04N 21/4532; H04N 21/25891; H04N 21/25883; H04N 21/4622; H04N 21/47202; H04N 21/41407; H04N 21/2665; H04N 21/64322; H04N 21/6125; H04N 21/6175; H04N 7/17318; H04N 21/4755; G06Q 30/02; G06Q 30/0269; G06Q 30/0251; G06Q 30/0242; G06Q 30/0241; G06Q 30/0255; G06Q 30/0271; G06Q 30/0224
USPC .......................................................... 725/34
See application file for complete search history.

(56) References Cited

U.S. PATENT DOCUMENTS

| | | | | |
|---|---|---|---|---|
| 9,026,668 | B2 * | 5/2015 | Harrison | H04L 67/22 |
| | | | | 709/229 |
| 9,396,475 | B2 * | 7/2016 | Cristofalo | G06Q 30/02 |
| 2002/0123928 | A1 * | 9/2002 | Eldering | G06Q 30/0255 |
| | | | | 705/14.52 |
| 2009/0055268 | A1 * | 2/2009 | Knoller | G06Q 30/02 |
| | | | | 705/14.61 |

(Continued)

*Primary Examiner* — Cynthia M Fogg
(74) *Attorney, Agent, or Firm* — Davis Graham & Stubbs LLP (57) ABSTRACT

The present invention relates generally to the provision of targeted advertisements in media. Systems and methods are described which facilitate addressable and non-addressable distribution of assets across a plurality of distribution networks and platforms. In this regard, an advertiser may be able to place a single order for advertising through a media distribution platform that allocates and distributes the asset via multiple channels such as internet streaming, websites (e.g., banners, pop-ups, overlays, etc.), cable, satellite, etc.

31 Claims, 4 Drawing Sheets

(56) References Cited

U.S. PATENT DOCUMENTS

| | | | |
|---|---|---|---|
| 2010/0082422 A1* | 4/2010 | Heilig | G06Q 30/02 |
| | | | 705/14.41 |
| 2010/0324992 A1* | 12/2010 | Birch | G06Q 30/02 |
| | | | 705/14.49 |
| 2013/0111519 A1* | 5/2013 | Rice | G06Q 30/02 |
| | | | 725/34 |
| 2013/0198005 A1* | 8/2013 | Xiong | H04N 21/23424 |
| | | | 705/14.66 |
| 2013/0326554 A1* | 12/2013 | Shkedi | H04N 21/812 |
| | | | 725/34 |
| 2017/0034591 A1* | 2/2017 | Ray | G06Q 30/0269 |
| 2017/0193547 A1* | 7/2017 | Berrett | G06Q 30/0276 |
| 2018/0336589 A1* | 11/2018 | Ye | G06Q 30/0276 |

\* cited by examiner

MEDIAHUB FOR CONTROLLING AND MONITORING THE DISTRIBUTION OF TARGETED ASSETS

CROSS-REFERENCE TO RELATED APPLICATION

This application is a non-provisional of U.S. Provisional Application No. 62/742,107, entitled, "MEDIAHUB FOR CONTROLLING AND MONITORING THE DISTRIBUTION OF TARGETED ASSETS," filed on Oct. 5, 2018. The contents of the above-noted application are incorporated by reference herein as if set forth in full and priority to this application is claimed to the full extent allowable under U.S. law and regulations.

FIELD OF THE INVENTION

The present invention relates generally to the provision of targeted advertisements in media. Systems and methods are described which provide a media distribution platform for streamlined procurement of targeted advertisement impressions.

BACKGROUND OF THE INVENTION

Network content or programming, including television shows, movies, news programs, and other content broadcast over the air, through a cable network or satellite, or online, is commonly provided in conjunction with associated informational content (or "assets"). These assets include advertisements delivered during program breaks, advertisements overlaid on or digitally inserted into programming, associated programming, public-service announcements, ad tags, other on-screen graphics or audio messages, weather or emergency notifications and a variety of other content, including paid and unpaid content. In this regard, advertisers wishing to convey information regarding services and/or products to subscribers of the broadcast network often pay for the right to insert their information into programming of the broadcast network, either directly or through a sales channel. For instance, an advertiser may provide an asset to a network operator such that the asset may be interleaved with broadcast network programming during one or more advertising breaks in the programming. The delivery of such paid assets often subsidizes or covers the costs of the programming provided by the broadcast network. This may reduce or eliminate costs borne by the users of the broadcast network programming.

In order to achieve a better return on their investment, advertisers often try to target their assets to a selected audience that is believed to be interested in the goods or services of the advertiser. The case of advertisers on a cable or satellite television network is illustrative. For instance, an advertiser on such a television network may wish to target its assets to certain individuals having attributes based on, for example, geographic location, gender, age, income etc. Accordingly, once an advertiser has created an asset that is geared toward a desired group of viewers, the advertiser may attempt to procure insertion times ("spots") in the network programming when the targeted group of individuals is expected to be among the audience of the network programming.

Historically, network content is provided from a programmer (e.g., content provider such as a broadcaster or national cable network such as ABC, PBS, BBC, etc.) to one or more distribution network platforms (e.g., regional headend and/or local headends and/or repeater stations). These distribution network platforms receive the content and disseminate that content to network users ("subscribers"). In this regard, the network content is sometimes termed a "national feed." Typically, this national feed includes programming and interleaved assets. In this regard, national level advertisers who wish to disseminate their assets network-wide may pay to have their assets interleaved with the programming of the national feed. Accordingly, when the distribution network platforms disseminate the network content received via the national feed, the interleaved assets are disseminated therewith. That is, interleaving of assets with the national feed typically results in a single asset being disseminated over the entire broadcast network.

In some broadcast networks (e.g., such as those in the United States), one or more cues may also be incorporated into the national feed. Such cues have allowed distribution network platforms (e.g., local headends) to identify upcoming breaks in the programming contained in the national feed. Accordingly, such local headends may replace an asset within the national feed with an asset that is better suited for a local audience. Typically, in the United States, two to three minutes of every hour are set aside for local advertisements.

Advertising spots may be filled with conventional, non-addressable assets or, in some cases, with addressable assets. In non-addressable (or "programmatic") environments, an asset is inserted into the programming stream on a network-wide basis or on a local basis. In either case (local or network-wide), the same asset is delivered to all viewers of the program, at least within the respective network subdivision. In addressable environments, specific assets may be targeted to specific subscribers based on known consumer information such as demographics, credit, past purchases, etc., even in situations in which subscribers reside in the same network subdivision. For example, a plurality of potential assets may be delivered as in the case where two network subscribers may both be viewing the same television channel and may both receive two assets that are stored on their respective boxes. The first box may insert the first asset while the second box may insert the second asset. Alternatively, a plurality of assets may not be delivered but rather only assets selected for insertion may be sent to a user's box as is the case where the first subscriber's box may only receive the first asset based upon delivery instructions from a distribution network platform while the second subscriber's box may only receive the second asset.

Whether in addressable or non-addressable environments, advertisers generally desire to target assets to defined audiences within the limitations of the advertising environment. In conventional, non-addressable environments, this can be accomplished by using ratings information. Such ratings are generally obtained by monitoring the viewing behavior of viewers who have agreed to participate, generally with specialized equipment. By monitoring the programs watched by those viewers, and correlating those programs to known demographic information for those viewers, ratings can be developed that characterize the audience composition for certain programs in terms of various demographics, e.g., age, gender, income, etc. Because the monitored viewers comprise a relatively small portion of all viewing households, reliable and complete ratings information may be limited to programs having large viewing audiences that yield a statistically significant sampling for at least some demographics.

Armed with ratings information, advertisers can bid on spots in programs with an audience that is attractive to the advertiser. In many cases, the winning bidder for a spot may have a targeted audience that makes up only a small minority of the overall audience for that program and, in fact, may have a targeted audience smaller than that of other bidders. This frequently leads to inefficient use of advertising availability. Moreover, advertisers with a target audience that does not match any set of attributes for which ratings are available (e.g., current truck owners or undecided voters in a given Congressional District) are forced to identify sets of rated attributes that can serve as proxies for the attributes of the targeted audience or otherwise identify targeted spots (e.g., via independent research).

Additionally, in recent years, video-on-demand ("VOD"), Over-the-top ("OTT"), and other alternative means of streaming content have gained popularity. Along with the advent of these systems, additional advertising models have been developed. To date, these alternative advertising channels have been implemented in a disparate manner with respect to broadcast systems. In other words, the two mechanisms operate independently without integrated systems.

The process of identifying, bidding on, and/or negotiating for available inventory in both broadcast and online streaming environments is a significant hurdle to efficient advertising campaigns. Currently each distribution network operates a separate advertising system. Each of these system employs disparate sales processes, pricing models, targeting data, and reporting capabilities. For example, each distribution network may enter into separate contract agreements with each advertiser, often requiring new negotiations for each advertising campaign. Along with the various contractual arrangements, there is a substantial degree of coordination involved with communicating campaign parameters and targeting data, transferring a copy of the asset, reporting information, etc. Not only does the immense amount of coordination (considering the substantial number of contractual arrangements) require a great deal of resources from a time and cost perspective, but it also can lead to delays in getting an asset inserted into programming. This may be problematic in situations in which time is of the essence.

Thus, there remains a need for a media distribution platform that improves the processes associated with purchasing advertising inventory, aggregates disparate targeting and reporting data, and improves the workflow of addressable and programmatic advertising.

SUMMARY OF THE INVENTION

The present invention is directed to utilities (e.g., methods, apparatuses, and systems) for procurement of targeted advertising through a central hub. The utilities provide a centralized media distribution platform capable of performing a multitude of operations traditionally requiring an array of platforms and systems, these operations including, inter alia, inventory management, contracting, content distribution, target identification, campaign optimization, settlements, auditing, and reporting.

Distribution of assets may follow traditional programmatic or modern addressable models. Traditional programmatic advertising relies upon broadcasting a particular asset to all subscribers in a network subdivision downstream of a particular network insertion point. In this regard, the term network subdivision may refer to any geographical region characterized as being downstream of a particular splice point in a distribution network. In the case of more modern, addressable environments, different viewers of a given program, even within a particular network subdivision, may receive different assets even while watching the same channel at the same time. This allows assets to be targeted based on location parameters independent of network topology, demographics, psychographics, or other targeting parameters or attributes of interest to an advertiser. Households or an individual user or users may be targeted based on attributes inferred from interaction with a set-top-box ("box") or network, an identity or characteristics determined by sensors, information from network or third-party databases and/or other information sources. In this regard, "addressable" does not necessarily connote addressing of assets to terminals in a point-to-point (unicast) transmission, but also encompasses techniques by which specific assets can be delivered via specific terminals using broadcast or multi-cast protocols.

It should be noted that even in networks that support addressable advertising, much advertising is still delivered in a non-addressable mode. This is due to a variety of limitations. First, some boxes may not support addressable functionality. For example, in the case of satellite networks, a storage device such as a digital video recorder (that not all network users have) may be necessary to store targeted assets for subsequent insertion at the box. Similarly, in cable networks, some boxes may not have the resources and logic required for executing addressable advertising. Over-the-air television generally does not support addressable advertising today and addressable advertising has not reached all areas. Moreover, some users may opt not to receive addressable advertising where that option is provided by the network for privacy or other reasons.

Even where the equipment and network allows for addressable advertising, much advertising inventory may be delivered in a non-addressable mode. For example, bandwidth or storage limitations may impose a practical limit on the number of spots that can be populated with addressable asset options. In addition, an addressable advertising system may only be implemented for either network-wide (e.g., national) or local spots. Typically, today, in the United States, perhaps about 16 minutes per hour is composed of advertising, of which about 14 minutes may be network-wide spots while two minutes may be available for local assets. Also, network operators may choose to sell full spots rather than audience segments or individual impressions for business or other reasons.

Reporting may be utilized in addressable advertisement systems to refine ratings information. Reporting is the process by which at least some individual set-top boxes and/or other client devices report to the distribution network after an addressable asset has been delivered. For example, the report may indicate what asset was delivered, in connection with which spot or programming network/program, and various other information as will be described in more detail below. It will be appreciated that, where asset delivery decisions are made at the box, reporting is useful to allow for determination of delivery data for billing and provide for guaranteed delivery of targeted assets. Even where decisions are centrally directed, e.g., based on instructions from the headend or another distribution network platform, a broadcast network typically does not know which boxes are on, what channel the boxes are turned to and cannot provide accurate delivery data in the addressable advertising context absent reporting.

In accordance with the present invention, a media distribution platform may be configured for coordination with external clients including advertisers (e.g., asset providers and sales channels/agencies), programmers (e.g., cable networks, broadcasters, online content providers, etc.) and distribution networks (e.g., multichannel video programming distributors or "MVPDs," websites, interne service providers, satellite broadcasters, mobile data networks, etc.) to facilitate targeted asset insertion into programming. Notably, both programmatic and addressable advertising may be facilitated by the disclosed media distribution platform.

Inventory allocation information including available spots (e.g., local spots, national spots, online streaming spots, etc.) for programmatic insertion and/or predicted available impressions for addressable insertion may be communicated from programmers and distribution networks to the media distribution platform. With regard to available spots which are broadcast to a wide audience, distribution networks generally know with a high degree of certainty what spots they will have available and when and can therefore provide relatively accurate data. In contrast, impressions (meaning a single instance of an asset being delivered to a single user) may need to be predicted. This is, in part, due to the nature of addressable advertising in which it is unknown when each particular subscriber will be engaged with their devices or otherwise streaming programming. In this regard, reporting may be particularly important to determine the volume of subscribers which have received the asset.

Inventory allocation information may be aggregated and stored for presentation to advertisers and for assigning assets associated with later received campaign instructions. Advertisers may access the media distribution platform through the front end module to submit assets (e.g., audio/video files) and to generate campaign instructions. Campaign instructions may include requirements such as target audience attributes, total number of impressions, minimum/maximum number of impressions per subscriber, frequency at which assets are to be presented to a single subscriber, campaign dates, etc. Additionally or alternatively, target audience attribute information may be automatically determined by the media distribution platform in response to receipt of campaign instructions containing alternative information such as the product to be sold, competitor products, other products associated with the product to be sold, etc. For example, a shoelace manufacturer may rely upon the media distribution platform to determine which subscribers to target by identifying those who recently made shoe purchases.

The media distribution platform may receive a list of current subscribers from each distribution network for use in targeting subscribers. The list of subscribers may comprise anonymous subscriber keys to prevent access to personally identifiable information. The list of subscriber keys, in conjunction with campaign instructions, may be analyzed by one or more data management platforms ("DMPs") which contain or have access to consumer information. The media distribution platform, using the DMPs, may identify specific subscribers matching campaign instructions provided by an advertiser and send insertion orders (including, e.g., subscriber keys) to distribution networks for addressing the targeted assets to the respective subscribers. One or more device IDs, associated with media devices such as mobile phones, set-top boxes, PCs, etc., may be associated with each subscriber key.

Either the media distribution platform or a distribution network may select specific devices of each subscriber to target with an asset. In this regard, the media distribution platform may instruct a specific distribution network to send a specific asset to a specific device associated with a subscriber who has been selected to receive an advertisement based upon consumer information available to the DMPs. It should be appreciated that a DMP may identify a specific subscriber having one device associated with one distribution network and another device associated with another distribution network, and in response, may select one or both devices for receipt of the asset(s). For example, a media distribution platform may instruct a mobile data distribution network to send an asset to a subscriber's mobile phone and may also instruct a satellite television distribution network to send the asset to the same subscriber's set-top box. Alternatively, in a coordinated advertising campaign, a first asset from an advertiser may be sent to a first device associated with a subscriber and a second, but related, asset from the same advertiser may be sent to a second device associated with the subscriber.

Importantly, a media distribution platform may be operable to target assets to users of various network and streaming systems (e.g., cable television, satellite television, OTT, VOD, etc.) in manner which presents a unified sales channel to advertisers. For example, an advertiser may purchase a specified quantity of impressions to a given attribute group corresponding to the advertiser's campaign instructions. The advertiser, optionally, may not even care to select specific network or streaming systems but rather may rely only upon their campaign instructions specifying a desired number of impressions and attributes associated with target subscribers while allowing the media distribution platform to select appropriate distribution networks. In response, the media distribution platform may identify users of various networks (e.g., mobile data network subscribers and cable network subscribers) matching the attribute requirements and transmit the asset to those subscribers in accordance with the campaign instructions. Reporting information from the various networks may be aggregated and returned to the advertiser to confirm the purchased impressions were delivered.

The reports can also be used to generate further analytics of interest to advertisers, network administrators, and others. Such analysis can involve developing information concerning levels of interest ("LOT") and conversions by audience members. Conversions refer to events where a viewer takes some action desired by the advertiser after viewing the asset. Examples include visiting a website of the advertiser or otherwise requesting additional information taking some specific action such as a test drive or ordering a free sample, and, of course, purchasing the product or service advertised. The last of these is perhaps the ultimate measure of ad effectiveness. Information concerning conversions may be obtained from internal or external sources. With regard to internal sources, an example is inputs to a Request for Information ("RFI") program. In some cases, in connection with addressable advertising systems, it is possible for a viewer to request more information in relation to an asset or other content. For example, the user may provide a designated remote control input during an asset or submit an alphanumeric code or other identifying information to a website or RFI platform. In response, the user can obtain further product information, promotional information, offers or the like. Reports may provide information regarding a level of interest or lack thereof by the audience receiving the asset. For example, the report may indicate that some viewers tuned-away during the asset or muted the asset. In addition, the report may indicate a confidence level that the viewer was present and engaged (e.g., based on how long it has been since the viewer last interacted with the box) and may provide information regarding attributes of the current audience (e.g., how many viewers, how well they match the targeting parameters for the ad, current estimates of classification parameters, or a putative identification of a current viewer). Such interest information may be analyzed today, for example, to gather information concerning asset effectiveness.

External sources of information associated with DMPs can also be used, for example, to monitor subsequent purchasing decision of an audience member. Potential sources of such information include credit card records, store loyalty program records, new vehicle registrations, and surveys, among others. Still further potential sources of direct responses purchases may include a 1-800 number, online ordering or help desk, or the like. Report information can be correlated to such purchasing decision information to determine whether audience members have purchased a product (or a competitive product or a related product) after viewing an asset or set of assets. Considered collectively, attribute information, voting, reports, and information concerning interest and concerning conversions provide a tremendous amount of audience information related to addressable advertising systems.

A media distribution platform may be communicatively coupled to a plurality of ancillary platforms. These ancillary platforms may perform supplemental functions (i.e., functions which are not core to the media distribution platform). Ancillary platforms may be operated by third-party providers ("partner organizations") and incorporated into the media distribution platform network. For example, a cloud-based API may be configured to allow remote access by and communication with partner organizations. Alternatively, some ancillary platforms may be locally disposed within or integrated into a media distribution platform. Ancillary platforms include, inter alia, DMPs, auditing, creative distribution, settlements, programmatic buying extension, and campaign optimization tools.

In an embodiment, a media distribution platform for assets may include a distribution network module, a data management platform, and a front end module. A distribution network module may be configured to receive a plurality of subscriber keys from one or more distribution networks. The subscriber keys may correspond to subscribers of the distribution networks. A data management platform may be configured to receive the subscriber keys and identify which of the subscribers are associated with various target attributes based upon consumer information available to or stored at the data management platform. In this regard, the subscribers may be evaluated using a predetermined set of attributes. For example, the data management platform may evaluate each subscriber based on age bands (e.g., does subscriber A fall into the 20-29 age bracket). Alternatively, the data management platform may retrieve specific attributes that are not associated with any predetermined characteristic groups or bands. For example, subscriber A is 37 years old. In the latter instance, the sales front end of a media distribution platform may assign, group, classify, or otherwise organize attributes for presentation to advertisers.

The front end module of a media distribution platform may be configured to receive inventory allocation information from inventory owners indicative of available advertising opportunities in programming content. In this regard, an inventory owner may be any party having an advertising opportunity for sale. For example, a broadcaster, a cable network, a distribution network, an interne service provider, etc. The front end module may further be configured to provide selectable targeting attributes to an advertiser via an advertiser interface. Selectable targeting attributes may be any potential audience attributes that an advertiser may wish to target. These selectable targeting attributes may be automatically populated based on consumer information retrieved by a data management platform, may be predetermined based upon standard industry options, may be manually entered by an administrator of the media distribution platform, or may be otherwise defined in any appropriate manner.

A front end module, a data management platform, or another component of a media distribution platform in accordance with the present invention may be operable to harmonize disparate targeting attributes and/or inventory allocation information. In this regard, targeting attribute categories or characteristics received from two or more different sources may not be identical. For example, a first source may use ten year age bands (e.g., 20-29, 30-39, etc.) while a second source may use five year age bands (e.g., 21-25, 26-30, etc.). In a similar regard, inventory owners may utilize different inventory allocation information schemes. For example, a first inventory owner may indicate availability of impressions to users residing in Pittsburgh while a second inventory owner may indicate availability of impressions to users in Pennsylvania. In any of the above mentioned scenarios, a media distribution platform may be operable to harmonize the disparate characteristics by assimilating characteristics from disparate sources into standardized classifications. In this regard, a media distribution platform may implement a targeting attribute and/or inventory allocation information scheme that comprises predetermined or dynamic characteristic groupings. As targeting attributes are received from a data management platform or as inventory allocation information is received from inventory owners, the characteristics associated with such information (e.g., tags) may be analyzed and optionally modified for conformance with the implemented scheme. In turn, information presented to potential advertisers via the advertiser interface may be homogeneously classified for ease of use and equitable distribution of available inventory (e.g., if only one distribution network utilized inventory allocation information that indicated the age band of 22-23 years old, then 100% of the impressions purchased by an advertiser selecting 22-23 years old would be allocated to that distribution network at the exclusion of all other distribution networks).

Furthermore, a front end module may receive campaign instructions and an asset (intended for distribution) from an advertiser. Campaign instructions may include one or more selected targeting attributes selected from the plurality of selectable targeting attributes discussed above. Additionally, a quantity of subscribers associated with the at least one selected targeting attribute may be included in the campaign instructions. This quantity may be used to calculate insertion orders for various distribution networks. The distribution network module may be further configured to transmit insertion orders to one or more distribution networks. The insertion orders may include the asset to be distributed or the asset may be transferred to the distribution networks independently. Insertion orders may also include a campaign target list corresponding to selected subscribers associated with at least one target attribute which corresponds to the at least one selected targeting attribute. In this regard, a selected targeting attribute may envelope a range of values or qualities defined by target attributes determined by the data management platform(s). For example, a target attribute may be defined as "age 21" whereas a selected targeting attribute selected by the respective advertiser may be "age 20-29." Similarly, a target attribute may be defined as "purchased a 2016 Ford Explorer on Nov. 1, 2016" whereas a selected targeting attribute may be defined as "purchased a vehicle between 2010 and 2018. Further in this regard, the term selected subscribers may be defined as those subscribers who have a target attribute that satisfies a selected targeting attribute selected by an advertiser.

A media distribution platform may be operable to combine inventory allocation information from a variety of sources. For example, inventory owned by a cable network may be presented to an advertiser in conjunction with inventory owned by a satellite provider. In some instances, the information presented to the advertiser may prevent the advertiser from discerning which inventory is owned by which party. Rather, the advertiser may simply be presented with available attribute options (e.g., age, income, recently purchased a given product, etc.) and a range impressions which may be purchased (e.g., 0 to 100M). In contrast, an advertiser may be presented with the option of selecting various types of inventory owners with which to transact (e.g., over-the-air broadcasters only).

Inventory allocation information may be associated with an inventory owner key unique to or otherwise associated with an inventory owner. In this regard, rather than storing (or presenting to users) identification information associated with an inventory owner (e.g., name of the company), such information may be anonymized. In turn, proprietary information such as available inventory, pricing, etc. may be kept confidential from competitors or other parties. When inventory allocation information is received at the media distribution platform, the media distribution platform may replace identification information with the respective inventory owner key. Data fields used by the data management platform that are related to the inventory owner may be populated with the inventory owner key. In this regard, the key, rather than the identification information, may be utilized by the media distribution platform and related third-party vendors in processing of inventory owner related information to maintain confidence.

A media distribution platform may be operable to present to advertisers various scopes of advertising opportunities. For example, an advertising opportunity may include an entire commercial advertisement spot, meaning a programmatic distribution of a single asset to all viewers of a particular program on a particular channel at a given time. In some instances, an advertiser may be able to select an even broader scope such as airing the asset once during every advertising break on every channel available for a month. On the other end of the spectrum, an advertiser may be able to select very specific advertising opportunities such as a single impression. For example, a private jet broker may wish to purchase a single playback of an asset to one person who purchased a home worth over $10M in the previous year. The entire range of potential scope of advertising opportunities available for sale and presented to advertisers by a media distribution platform is contemplated.

Inventory allocation information may include any of a variety of characteristics or constraints associated with available advertisement opportunities. For example, a date and time during which the available advertisement opportunity is scheduled (if any, as there may not be a schedule associated with impressions), a requested price associated with the available advertisement opportunity, historical subscriber attribute information associated with programming content scheduled around the available advertisement opportunity (e.g., the audience that typically watches the television show scheduled around the advertisement break is typically retired married couples), limitations placed by the host (e.g., kid friendly assets only), etc.

The advent of addressable advertising has enabled delivery of assets to users regardless of location. For example, traditionally, in an effort to target all voters inside a particular political boundary, some subscribers outside the political boundary inevitably received an asset that was not targeted toward them. This is because cable network infrastructure is typically not installed in accordance with political boundaries. However, a media distribution platform may be operable to deliver an asset only to subscribers residing within a political boundary, independent of network topology.

A campaign target list may include a list of subscriber keys associated with selected subscribers. In this regard, selected subscribers may be those who are associated with a target attribute, as determined by a DMP, which satisfies or is included in a selected targeting attribute selected by an advertiser.

A data management platform may be further operable to maintain or have access to a database of device IDs which are associated with subscriber keys. In this regard, a subscriber key may be an encoded, encrypted, anonymous, or otherwise secure identifier associated with a subscriber that prevents revelation of personally identifiable information. Because a subscriber may own, use, or otherwise be associated with multiple devices (e.g., cell phone, set-top box, tablet PC, etc.), each unique subscriber key may be associated with multiple device IDs, each device ID unique to a particular device.

A campaign target list may comprise a list device IDs usable for addressing delivery of the asset to each respective electronic device. In this regard, each distribution network receiving insertion orders from a media distribution platform may receive a list of device IDs which enable the distribution network to address the asset to the respective device. In the alternative, a media distribution platform may simply transmit subscriber keys to the distribution networks and allow the distribution networks to determine which devices to target (as may be the case where a subscriber has multiple devices on a single distribution network).

Consumer information accessed by or stored within a data management platform, and used in identification or selection of targeted subscribers, may be any information related to a subscriber (i.e., potential consumer) and of interest to an advertiser. For example, consumer information may include at least one of credit score, loyalty program membership, income, past purchase data, gender, occupation, social media activity, requests for information submitted by the user to a distribution network, email lists, age, etc.

A media distribution platform may be further operable to receive reporting information from distribution networks. Reporting information may include affirmation that the asset was transmitted to at least one device associated with a given subscriber, affirmation that the asset was displayed on a particular device, or information indicating that a selected subscriber actively engaged the device during display of the asset.

A media distribution platform may include a settlements module. A settlements module may be configured to calculate an account balance of an advertiser or other party based upon received reporting information. For example, an advertiser may not be billed until after an asset has aired as verified by an auditor. In this regard, as confirmation of each individual asset is received at the media distribution platform via reporting information, the settlements module may update an account balance reflecting charges owed by the advertiser for the confirmed impressions. A settlements module may also be tasked with monitoring sums due from other market participants including distribution networks, ad agencies, sales channels, programmers, etc. For example, a revenue sharing agreement may be established within the media distribution platform for automatic allocation of received payments to a cable network and a satellite broadcaster based on an asset that has aired on the cable channel as distributed by the satellite broadcaster. In this regard, the media distribution platform may serve to administer the agreement.

A media distribution platform may further include an audit module. Such module may perform any relative auditing function. For example, an audit module may be configured to provide a third-party auditor access to auditing data associated with the media distribution platform. Auditing data may be at least partially based upon received reporting information, campaign instructions, insertion order, and other data received by or transmitted from a media distribution platform. Auditing data may be anonymized to prevent unauthorized access to personally identifiable information.

Further, a media distribution platform may include a programmatic buying extension. A programmatic buying extension may assist in bridging the gap between non-addressable and addressable systems. For example, a programmatic buying extension may be configured to analyze consumer information from the data management platform(s) and the received reporting information to estimate influence information associated with a non-targeted media asset. Influence information may be any data associated with the scope or attributes of an audience. Specifically, confirmed impressions of a given asset as aired during a particular television show may be used to estimate the number of subscribers having the same attribute or set of attributes that will receive a programmatic asset during the same television show at the same time or even at a later date. In this regard, reporting information from addressable asset impressions may serve as a more accurate proxy for traditional ratings information.

A media distribution platform may also include campaign optimization tools. These tools may be configured to analyze campaign instructions and associated reporting information to formulate suggested campaign instructions. In this regard, certain campaign instructions may yield undesirable results whereas other campaign instructions, from the same or another advertiser in the same industry, may yield favorable results. In response, campaign optimization tools may analyze the differences between the sets of campaign instructions to return to an advertiser a set of suggested changes that should be made to their campaign (e.g., 30-34 year olds have 10% higher conversion rate than 35-39 year olds and therefore more impressions of the younger age range should be purchased).

Further a media distribution platform may include a creative distribution module. Such module may be configured to transmit an asset to distribution networks, with or without associated insertion orders. In this regard, the creative distribution module may be configured for secure and/or streamlined communication with distribution networks to transmit assets for which insertion orders have been generated by the media distribution platform.

It should also be appreciated that the above functionalities of a media distribution platform are considered applicable in all forms of advertising involving insertion of an asset into audio/video programming. An advertiser may purchase a given number of impressions and a media distribution platform may be configured to allocate those impressions over disparate distribution networks. For example, one subscriber of a traditional cable MVDP may be watching a given cable channel at a particular time. At the same time, a subscriber of an online streaming service may also be watching the same, or a different cable channel. Despite the use of different distribution networks, both subscribers may receive the same asset based upon consumer information determined by a data management platform of a media distribution platform.

Methods of distributing assets in accordance with above described media distribution platform embodiments are also envisaged and considered within the scope of this disclosure.

BRIEF DESCRIPTION OF THE DRAWINGS

For a more complete understanding of the present invention and further advantages thereof, reference is now made to the following Detailed Description, taken in conjunction with the drawings, in which.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Figure 1:
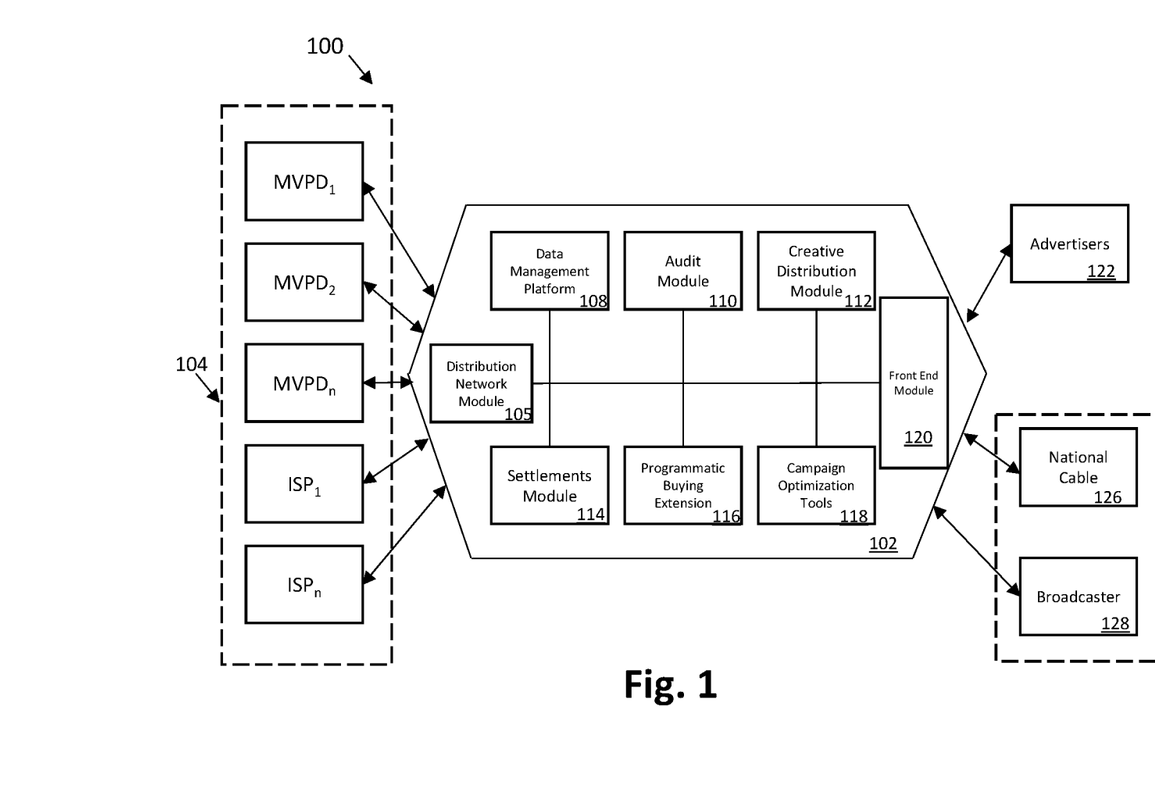
FIG. 1 is a block diagram of an embodiment of a media distribution platform for controlling and monitoring the distribution of targeted media assets.

FIG. 1 illustrates a block diagram of a system architecture associated with a media distribution platform 102. It should be appreciated that the various modules illustrated and described as being included in media distribution platform 102 may each be optional, may each be co-located or may be geographically distributed, may be singular or plural, may be implemented on a single machine or distributed across multiple machines, and may or may not be co-owned. In this regard, certain modules such as DMP 108, audit 108, creative distribution 112, settlements 114, programmatic buying extension 116, campaign optimization tools 118, and front end module 120 may be provided by third-party partners. Furthermore, additional components of a media distribution platform may be provided although not shown in the illustrated embodiment. For example, a distribution network module, processing engine and/or a memory module may be provided to facilitate the functionalities described herein.

Any number of distribution networks 104 and programmers 124, such as broadcaster 128 and national cable network 126, may be in operative communication with media distribution platform 102 to convey inventory allocation information such as availability of spots for insertion of assets, pricing associated with each spot, attribute information associated with predicted viewers of each spot, an anticipated total number of impressions available, etc. Distribution networks 104 may be any providers that distribute programming content.

In addition to inventory allocation information, distribution networks 104 may communicate subscriber keys, or any other identification information related to current or past subscribers, to media distribution platform 102. These subscriber keys may be used to retrieve consumer information from DMP 108. Such consumer information may comprise any data relevant to identifying candidate targets to receive the asset including, inter alia, demographics, purchasing history, credit reports, credit card and bank transactions, social media activity, RFI submissions, websites visited, travel history and plans, or other attributes.

Media distribution platform 102 may present to advertisers 122, via front end module 120 (which may include an API), inventory allocation information. This information may take any one of various forms and may include, but is not limited to, available spots, predicted available impressions and time constraints, aggregated consumer information, pricing, etc. In this regard, advertisers 122 may be able to sort, filter, and otherwise organize the inventory allocation information to identify, select, and purchase a desired block of insertion opportunities. For example, an advertiser may select an entire spot to purchase, in which case each subscriber of the relevant distribution network platform may receive the advertiser's asset. Additionally or alternatively, the advertiser 122 may select specific attributes or other constraints with campaign instructions. Aggregated consumer information comprising the total number of subscribers and/or impressions available across various classifications of targeting attributes may be used for aligning campaign instructions with impressions. For example, a tire manufacturer may select and purchase 5,000 impressions to males between the ages of 20-29 who purchased a new car between 3-5 years ago. In such an instance, the media distribution platform 102 may identify subscribers matching the campaign instructions and transmit insertion orders to one or more distribution networks 104, wherein such insertion orders collectively total the 5,000 impressions. The front end module 120 may also provide an interface for advertisers 122 to upload their asset to the creative distribution module 112. The asset may be transmitted from the creative distribution module 112, along with the respective insertion orders, to the distribution networks 104.

Reporting information may be generated by user devices, such as set-top boxes, mobile phones, etc., and received by each respective distribution network 104. This reporting information may be used by each distribution network 104 to confirm delivery of each impression. If reporting information indicates a particular impression was not made (e.g., the asset failed to stream, the subscriber changed channels before the asset played, the subscriber powered off the device, etc.), the impression may be re-attempted by the distribution network 104. Upon verification of the total number of impressions assigned to a respective distribution network being made, in accordance with the reporting information, the distribution network 104 may cease delivery of the respective asset. In some instances, a media distribution platform 102 may over-assign impressions to distribution networks 104 to expedite a campaign. This may be desirable in the event that campaign instructions indicate a limited window of time for delivery. As an example, media distribution platform 102 may assign 1,000 impressions of an asset to each of eight distribution networks even though campaign instructions associated with the asset indicate only 5,000 total impressions. In this regard, the distribution networks 104 may transmit reporting information to media distribution platform 102 in substantially real-time (or at regular intervals) such that media distribution platform 102 may keep a running tally of the impressions made and/or confirmed by reporting information. Upon reaching the 5,000 impression total, the media distribution platform 102 may send instructions to each distribution network 104 to cease the campaign.

Following delivery of an asset by a distribution network 104, media distribution platform 102 may compile reporting information from a plurality of distribution networks 104. This information may be communicated to the respective advertiser 122 and may include such information as specific attributes of subscribers that received the asset, dates and times of delivery, content into which the asset was inserted, etc. Compiled reporting information may also be utilized for auditing and settlements.

Audit module 110 may be tasked with verification that the reporting information indicates compliance with the campaign instructions. For example, if campaign instructions specify that 20-29 year olds should be targeted, but the reporting information indicates that at least a portion of the impressions made were to subscribers outside that age band, audit module 110 may initiate the transmission of additional insertion orders to the respective distribution network 104 and/or may provide an indication to settlements module 114 that the price to be invoiced to the advertiser 122 should be adjusted accordingly. Settlements module 114 may generate billing invoices based upon campaign instructions, reporting information, and auditing information.

Audit module 110 may also be tasked with independently verifying accurateness of reporting information. For example, auditing module 110 may provide access to reporting information to a third-party auditor. Such auditor may independently poll subscribers, have access directly to set-top box reporting data, or may otherwise verify delivery of a statistical sampling of subscribers to verify that reporting information received from distribution networks 114 is accurate.

Reporting information and consumer information may be analyzed by campaign optimization module 118. The campaign optimization module 118 may produce recommendations for improved campaign performance. For example, algorithms may be used to identify campaign instruction and reporting information metrics which are associated with high conversion rates. This information may then be used to alter a campaign or to provide suggestions to advertisers 122 to increase conversion rates.

Programmatic buying extension module 116 may be operable to facilitate improved targeting of programmatic asset insertion based upon addressable insertion reporting. In this regard, reporting information pertaining to addressable impressions may be analyzed by the media distribution platform 102 to predict viewing audiences associated with various programming content. Equipped with this information, programmatic buying extension 116 may provide insight into which particular spots should be purchased by an advertiser 122 to satisfy their campaign instructions. For example, $MVPD_1$ may be an addressable distribution network which distributes a particular cable network. Reporting information from $MVPD_1$ may be used to determine what percentage of the viewing audience fit a particular demographic during a television show aired on the cable network. Using that information, an advertiser 122 may identify that particular television show as a candidate for insertion of an asset on $MVPD_2$ which may be a programmatic distribution network which also distributes the particular cable network. In this regard, the relatively specific reporting information from an addressable distribution network may be used in lieu of or in addition to ratings information which is typically less accurate.

Figure 2:
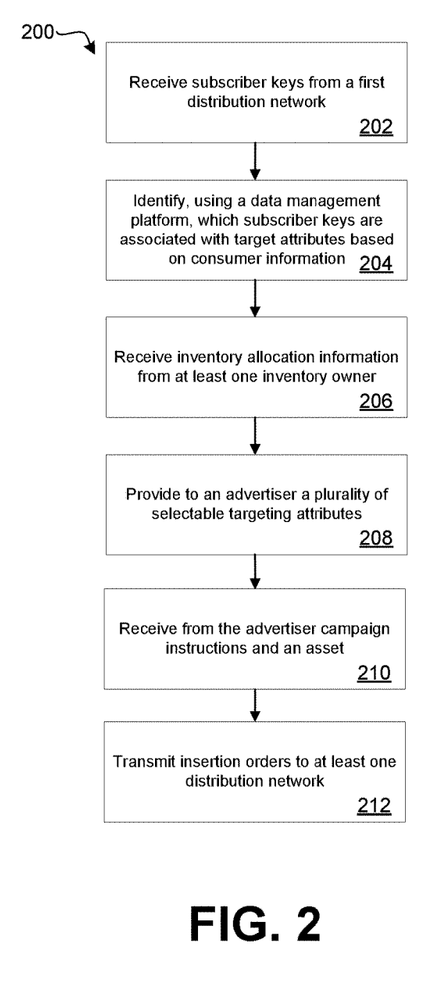
FIGS. 2-4 are flow charts illustrating methods of distributing an asset.

FIG. 2 illustrates a method of distributing an asset. A media distribution platform may receive a plurality of subscriber keys from at least one distribution network 202. The distribution network may be any distributor of programming content. Utilizing a data management platform, the media distribution platform may identify which of the subscriber keys are associated with target attributes based on consumer information (e.g., which subscribers are associated with the target attributes) 204. In this regard, the data management platform may access one or more databases containing consumer information. The consumer information may be stored in conjunction with subscriber identification information (e.g., name, address, etc.). In this regard, the data management platform may reference a table or database to determine identification information associated with the respective subscriber key. Using the identification information, the data management platform may retrieve consumer information pertaining to the identification information. To illustrate, a data management platform may receive a first subscriber key. The data management platform may access a database to retrieve an address associated with the subscriber key. Using the address, the data management platform may retrieve consumer information such as vehicle registrations, home purchase price, age, etc. Alternatively, consumer information may be stored in relation to the subscriber key to which it corresponds. In this regard, the data management platform may be operable to retrieve consumer information directly based upon the subscriber key rather than referencing a table or database to retrieve subscriber identification information. In either case, each subscriber key received by at least one data management platform may be associated with various forms and pieces of consumer information to be used in selecting subscribers to target with an asset.

A data management platform may receive inventory allocation information from at least one inventory owner 206. Inventory allocation information may include availability of spots and/or impressions in programming content. For example, cable network may submit to the media distribution platform inventory allocation information including list of upcoming ad breaks and demographic information traditionally associated with programming content surrounding each ad break. Alternatively or additionally, a distribution network may submit inventory allocation information including a number of impressions (which in some instances may be estimated) available and timing associated therewith.

A data management platform may provide to one or more advertisers a plurality of selectable targeting attributes 208. The selectable targeting attributes may correspond to consumer information that has or is anticipated to be identified by the data management platform. For example, selectable targeting attributes may include gender, location, age, hobbies, purchased goods (e.g., car, computer, etc.), or any other ascertainable consumer information that may be of interest to an advertiser. The selectable targeting attributes may be harmonized as discussed above to provide a coherent selection scheme to advertisers.

An advertiser may submit campaign instructions and an asset via a front end module of the data management platform 210. Campaign instructions may include a selection of one or more of the selectable targeting attributes, an agreed upon pricing structure, timing and other constraints, etc. Based on the campaign instructions and received asset, the media distribution platform may transmit insertion orders to at least one distribution network 212. The media distribution platform may be operable to automatically identify subscribers or subscriber keys associated with target attributes which correspond to the selectable targeting attributes in the campaign instructions. Upon identifying the subscribers (or keys), the media distribution platform may generate the insertion orders for one or more distribution networks. In this regard, the media distribution platform may be operable to optimize allocation of impressions in accordance with the campaign instructions. For instance, optimization may be based upon pricing, conversion rates, subscriber base composition, etc. To illustrate, an advertiser may submit campaign instructions indicating 500,000 males are to receive one impression of the asset each. A first distribution network may have submitted inventory allocation information comprising availability of impressions to 300,000 males at a designated price per impression. A second distribution network may have submitted inventory allocation information indicating availability of impressions to 300,000 males at a higher price per impression. The media distribution platform may be operable to optimize the allocation of impressions requested in campaign instructions by assigning 300,000 impressions to the first distribution network and 200,000 impressions to the second distribution network to minimize the cost to the advertiser while complying with the campaign instructions.

Figure 3:
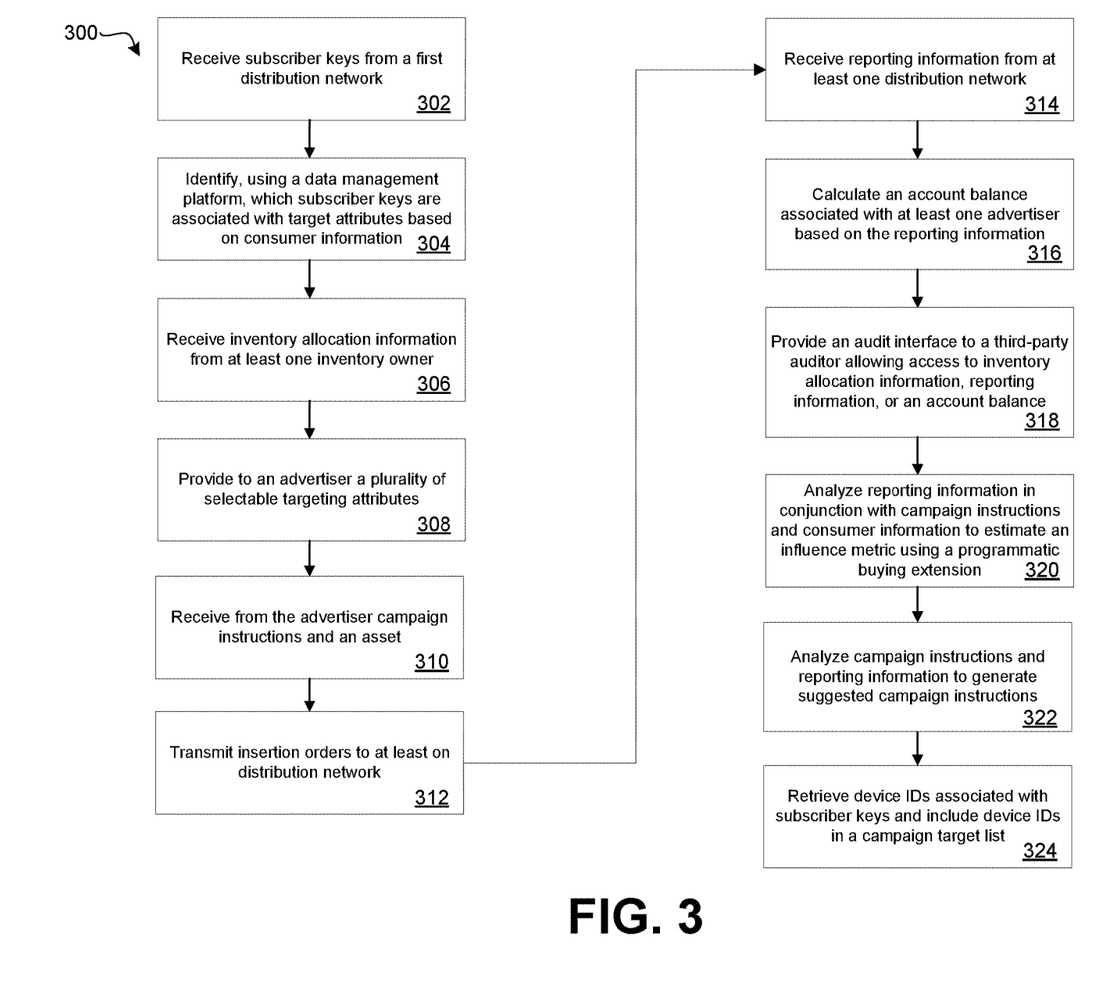

FIG. 3 illustrates another method of distributing an asset. Steps 302-312 may directly correspond to steps 202-212 of FIG. 2 discussed above. Notably, steps 314 through 324 may be each be optional and may be performed in an order that is not reflected in FIG. 3. At step 314, the media distribution platform may receive reporting information from at least one distribution network that has previously received insertion orders and a corresponding asset. Reporting information may include confirmation of delivery to each targeted device, information regarding subscriber interaction during display of the asset, any other information received from set top boxes or other devices, etc.

Based upon the reporting information, the media distribution platform may calculate (316) an account balance associated with the advertiser. A settlements module or any other component of the media distribution platform may be utilized to calculate the account balance. The balance may reflect, inter alia, the number of impressions delivered, the accuracy of the targeting (e.g., 95% accuracy may indicate that 5% of the impressions were delivered to subscribers that do not match the selected targeting attributes), agreed upon pricing, and price adjustments made based upon compliance with campaign instructions.

A third-party auditor may be provided access to data associated with the media distribution platform via an audit interface 318. The auditor may be tasked with verification of information to assure compliance with agreed upon terms. For example, the auditor may review reporting information in conjunction with a statistical sampling of survey participants selected from a subscriber base. If a statistically significant anomaly is detected between the survey results and the reporting information, the auditor may notify one or more participants (e.g., operator of the media distribution platform, a distribution network, an advertiser, etc.).

A programmatic buying extension may be operable to analyze reporting information in conjunction with campaign instruction and consumer information to estimate an influence metric 320. In this regard, reporting information and consumer information received in response to the distribution of an addressable asset may be utilized to generate predicted influence of an asset. For example, a first asset may be distributed in an addressable manner. Characteristics of the distribution of the first asset may be informative in distribution of a second, non-addressable asset, for instance based on identification of programming content into which the first asset was inserted.

Campaign optimization tools accessible by the media distribution platform may be used to analyze campaign instructions, reporting information, and consumer information to generate suggested campaign instructions 322. In this regard, the media distribution platform may ascertain, based upon reporting information, characteristics of the distribution of an asset and utilize those characteristics to optimize future impressions or campaigns. As one example, an asset may be distributed to subscribers during three different television shows. The media distribution platform may access consumer information to determine that viewer of one of the three television shows had a higher conversion rate than viewers of the other two television shows. In turn, the media distribution platform may generate suggested campaign instructions indicating that more impressions should be channeled to the first of the three television shows. The suggested campaign instructions may be implemented by the media distribution platform automatically or may be presented to the corresponding advertiser for approval.

Figure 4:
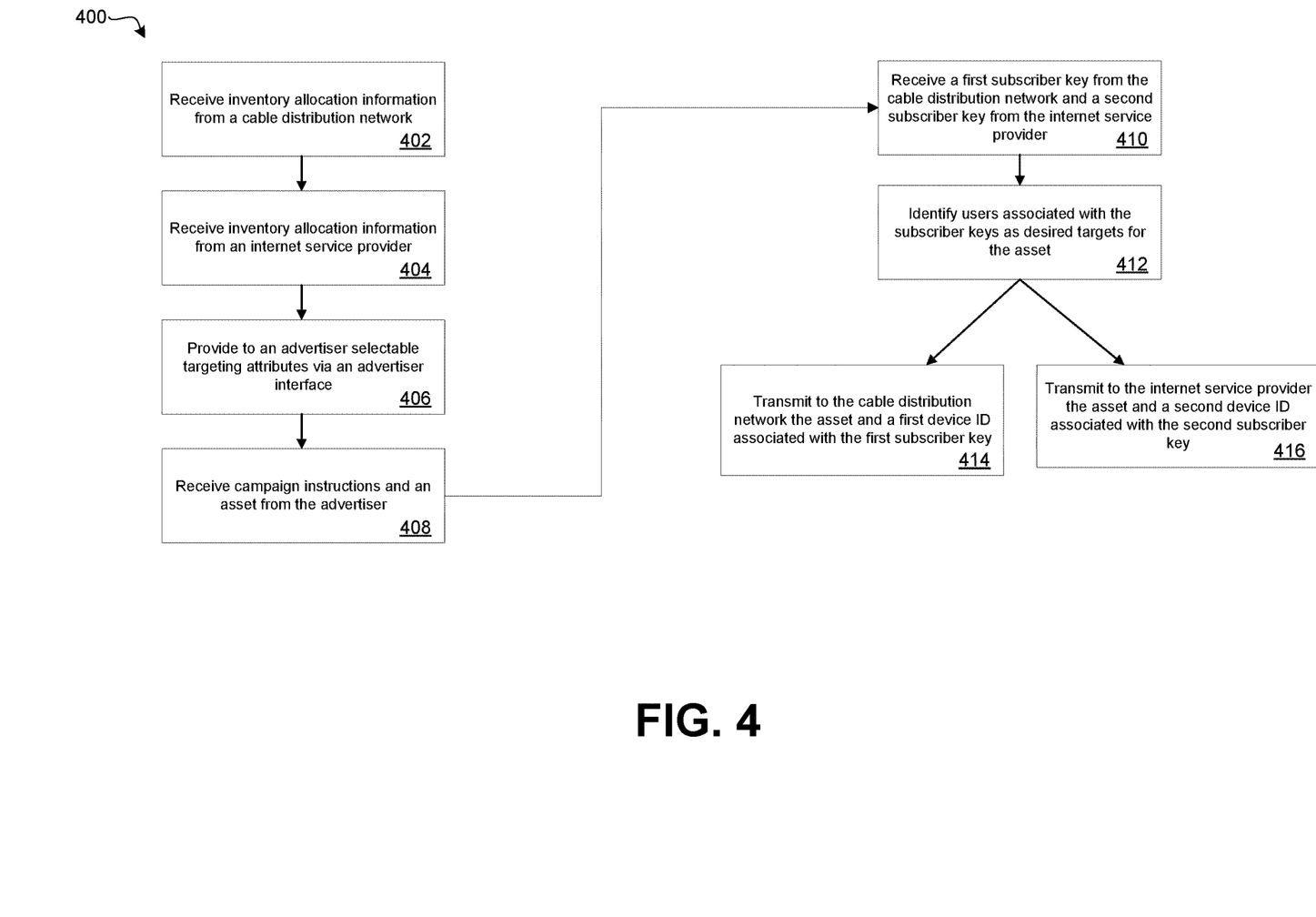

FIG. 4 illustrates a method of distributing an asset. The method may be similar to that discussed in relation to FIGS. 2 and 3 above, but specifically involving distinct distribution networks. In the example illustrated, the distribution networks are a cable distribution network and an internet service provider, although it should be appreciated that any combination of distribution networks may be utilized.

The media distribution platform may receive inventory allocation information from a cable distribution network 402 and inventory allocation information from an internet service provider 404. An advertiser may be presented selectable targeting attributes via an advertiser interface 406. The media distribution platform may then receive campaign instructions and an asset from the advertiser 408. A first subscriber key may be received from the cable distribution network and a second subscriber key may be received from the internet service provider 410. The subscriber keys may be utilized by a data management platform to identify subscribers (e.g., users) as desired targets for the asset based upon consumer information associated with the subscribers or subscriber keys 412. Based on identification (or confirmation) of the subscriber keys being associated with desired targets, the media distribution platform may transmit the asset and insertion orders to distribution networks indicating availability of impressions corresponding to the campaign instructions. For example, the media distribution platform may transmit the asset and insertion orders comprising a device ID associated with the first subscriber key to the cable distribution network 414 and also may transmit the asset and insertion orders comprising a device ID associated with the second subscriber key to the internet service provider 416. Notably, the subscriber keys may be transmitted in lieu of the device IDs and the respective distribution networks may identify the device IDs based upon the subscriber keys.

The following use cases are provided to illustrate potential real-world uses of a media distribution platform. They are intended to be exemplary only and should not be considered limiting.

Use Case #1

A cable distribution network may submit inventory allocation information to a media distribution platform indicating that, based on historical usage, it estimates an available 50 million impressions next month. The cable distribution network may also submit a list of subscriber keys associated with subscribers to its television service.

A mobile data distribution network may submit inventory allocation information to the media distribution platform indicating that, based on historical usage, it estimates an available 30 million impressions next month. The mobile data distribution network may also submit a list of subscriber keys associated with subscribers to its mobile data service.

The media distribution platform may then process the subscriber keys from both networks using a data management platform to retrieve, identify, and associate subscriber keys with target attributes. For example, each subscriber key may be added to a table that lists each subscriber key's corresponding age, address, income, purchases, gender, familial status, credit score, etc. Notably, some consumer information may be unavailable for some subscriber keys in which case that field may be left blank or filled with a placeholder.

A list of selectable targeting attributes may be generated and presented to an advertiser via an advertiser interface. The list, in some cases, may be generated in response to attributes identified by the data management platform such that the list directly corresponds to the retrieved consumer information. In other cases, the list may be a standardized list used by the media distribution platform. As an example, an advertiser may access the media distribution platform to purchase impressions. The advertiser's user may see a list of selectable targeting attributes corresponding to the target attributes discussed above (e.g., age bands, geographic areas (may be a map on which regions can be selected or user may draw a boundary line to select subscribers inside the boundary), income bands, product categories, gender, familial status categories, credit score bands, etc.).

The advertiser's user may select 30,000 impressions in the Philadelphia area and 30,000 impressions in the Dallas area wherein the impressions are to be made to any given user no more than two times. Accordingly, campaign instructions may be created by or received at the media distribution platform comprising these criteria along with an asset comprising a commercial advertisement about the advertiser. Based on the selected targeting attributes, the media distribution platform may identify subscriber keys associated with subscribers that fit the criteria of the campaign instructions.

Based on the inventory allocation information and/or data management platform databases, the media distribution platform may determine that the cable distribution network is suited to deliver impressions in Philadelphia where the cable distribution network has infrastructure but is not suitable to deliver impressions in Dallas where it does not provide service. Similarly, the media distribution platform may determine that the mobile data distribution network provides mobile data network coverage in both cities and is therefore suited to deliver impressions in both locations. Accordingly, the media distribution platform may generate and transmit insertion orders to the cable distribution network instructing the delivery of 20,000 impressions of the asset to subscribers in Philadelphia wherein no subscriber is to receive the impression more than twice (e.g., they will not be compensated for additional impressions). The media distribution platform may also generate and transmit insertion orders to the mobile data distribution network instructing the delivery of 10,000 impressions in Philadelphia and 30,000 impressions in Dallas with a maximum compensable delivery of two impressions per each subscriber. It should be appreciated that the allocation of impressions in the insertion orders may be divided in any manner that satisfies the criteria of the campaign instructions. The specific example given is exemplary only. Notably, the insertion orders may include the subscriber keys associated with the targeted subscribers or may include device IDs corresponding to specific devices (e.g., set top boxes for the cable distribution network and mobile phones or tablets for the mobile data distribution network).

The insertion orders may include an exact number of subscriber keys (or device IDs) corresponding to the allocated number of impressions or may include a surplus amount to ensure timely delivery. For example, although the cable distribution network may be allocated exactly 20,000 impressions to Philadelphia, the insertion orders may include 10,000 subscriber keys for delivery of two impressions each or may include 100,000 subscriber keys such that the cable distribution network may deliver impressions on a first available basis. In the latter case, upon receiving reporting information confirming delivery at 20,000 boxes, the cable distribution network may cease transmission of the asset.

Reporting information from the cable distribution network may be received at the media distribution platform and utilized by various modules. For instance, a settlements module may receive reporting information indicating that the cable distribution network delivered 12,000 impressions to unique subscribers and 10,000 impressions were delivered to 10,000 of those same users. In such an instance, the settlements module may determine that 2,000 impressions are non-compensable for exceeding the 20,000 allocated impressions. Accordingly, the settlements module may calculate an account balance corresponding to 20,000 impressions to be paid to the cable distribution network by the advertiser at a price set by the cable distribution network and displayed to the advertiser's user via the advertiser interface during generation of the campaign instructions. Reporting information may also be received from the mobile data distribution network and utilized in a similar manner.

An auditing module of the media distribution platform may also analyze reporting information to confirm accuracy. For example, an auditor may conduct a survey of a sampling of the subscribers whose subscriber keys were included in the insertion orders. If a statistically significant anomaly is discovered, parties may be notified for further investigation.

Use Case #2

A cable distribution network may submit inventory allocation information to a media distribution platform indicating that it has a programmatic spot available during an upcoming airing of a new episode of a popular television show on a Sunday night during prime time.

A mobile data distribution network may submit inventory allocation information to the media distribution platform indicating that it has an available 30 million impressions next month. The mobile data distribution network may also submit a list of subscriber keys associated with subscribers to its mobile data network.

The media distribution platform may then process the subscriber keys from the mobile data distribution network using a data management platform to retrieve, identify, and associate subscriber keys with target attributes.

A list of selectable targeting attributes may be generated and presented to an advertiser via an advertiser interface. As an example of an advertiser being presented with a list of selectable targeting attributes, a car manufacturer may access the media distribution platform to purchase impressions. The car manufacturer's user may see a list of selectable targeting attributes corresponding to the target attributes discussed above (e.g., age bands, geographic areas (may be a map on which regions can be selected or user may draw a boundary line to select subscribers inside the boundary), income bands, product categories, gender, familial status categories, credit score bands, etc.).

The car manufacturer's user may select 500,000 unique impressions nationwide to truck owners during the upcoming Sunday night prime time. Accordingly, campaign instructions may be created by or received at the media distribution platform comprising these criteria along with an asset comprising a commercial advertisement about the car manufacturer's truck models. Based on the selected targeting attributes, the media distribution platform may identify subscriber keys associated with the mobile data distribution network subscribers that fit the criteria of the campaign instructions.

Based on the inventory allocation information and/or data management platform databases, the media distribution platform may determine that the mobile data distribution network is suited to deliver addressable impressions, but may estimate that less than 500,000 unique subscribers that are truck owners will stream programming content on the mobile data distribution network during primetime on Sunday night. Accordingly, the media distribution platform may determine that the available cable distribution network spot may be used programmatically to supplement the expected deficiency of the mobile data distribution network. Accordingly, the media distribution platform may generate and transmit insertion orders to the mobile data distribution network instructing the delivery of all available impressions of the asset to during the selected period of time. The media distribution platform may also generate and transmit insertion orders to the cable distribution network instructing the insertion of the car manufacturer's asset into the programmatic spot.

Reporting information from the mobile data distribution network may be received at the media distribution platform and utilized to determine that the mobile data distribution network delivered 270,000 impressions of the car manufacturer's asset during the time window. The reporting information may also be analyzed to determine that of those 270,000 impressions, 120,000 of them occurred during the airing of the popular television show. The media distribution platform may determine that the 120,000 truck owners represent 40% of the total the mobile data distribution network viewers that watched the popular television show. Accordingly, the media distribution platform may appropriately estimate that 40% of the total cable distribution network viewers that watched the popular television show are likely also truck owners. The total number of cable distribution network viewers that watched the popular television show may be determined by any appropriate means such as Nielsen ratings. Assuming that 800,000 cable distribution network subscribers watched the popular television show, it may be assumed that 320,000 truck owners received impressions of the car manufacturer's ad on the cable distribution network. Accordingly, the settlements module may calculate an account balance corresponding to 270,000 impressions to be paid to the mobile data distribution network by the car manufacturer. The media distribution platform may also calculate a number of impressions are payable by the car manufacturer to the cable distribution network somewhere between 230,000 impressions (i.e., 500,000 requested impressions minus the 270,000 impressions by the mobile data distribution network) and 320,000 impression (i.e., the estimated number of impressions made to truck owners by the cable distribution network).

An auditing module of the media distribution platform may also analyze reporting information to confirm accuracy. For example, an auditor may conduct a survey of a sampling of the cable distribution network subscribers to confirm the accuracy of the 40% estimation.

The foregoing description of the present invention has been presented for purposed of illustration and description. Furthermore, the description is not intended to limit the invention to the form disclosed herein. Consequently, variations and modifications commensurate with the above teachings, and skill and knowledge of the relevant art are within the scope of the present invention. The embodiments described herein above are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The invention claimed is:

1. A media distribution platform for assets, comprising:
a distribution network module configured to receive subscriber keys from a first distribution network corresponding to subscribers of the first distribution network, wherein said first distribution network distributes network content to subscribers independent of said media distribution platform;
a data management platform configured to receive the subscriber keys and identify which of the subscribers are associated with each of a plurality of target attributes based upon consumer information; and
a front-end module configured to:
receive first inventory allocation information from a first inventory owner indicative of a first available advertising opportunity in programming content;
receive second inventory allocation information from a second inventory owner indicative of a second available advertising opportunity in programming content;
provide a plurality of selectable targeting attributes to an advertiser via an advertiser interface; and
receive campaign instructions and an asset from said advertiser, wherein the campaign instructions comprise at least one selected targeting attribute selected from the plurality of selectable targeting attributes and a quantity of subscribers associated with the at least one selected targeting attribute;
wherein the distribution network module is further configured to transmit one or more insertion orders to the first distribution network, wherein the insertion orders comprise the asset and a campaign target list including a number of said subscriber keys corresponding to selected subscribers associated with at least one target attribute which corresponds to the at least one selected targeting attribute, wherein said first distribution network employs said insertion orders to cause delivery of said asset to said selected subscribers in conjunction with said network content.

2. The media distribution platform of claim 1, wherein:
the first inventory owner is the first distribution network; and
the second inventory owner is a second distribution network.

3. The media distribution platform of claim 1, wherein:
the first inventory owner is the first distribution network; and
the second inventory owner is a first programmer.

4. The media distribution platform of claim 1, wherein:
the first inventory owner is a first programmer; and
the second inventory owner is a second programmer.

5. The media distribution platform of claim 4, wherein: the first distribution network is a multichannel video programming distributor; and the first programmer is a national cable network or a broadcaster.

6. The media distribution platform of claim 1, wherein:
at least one of the first and second advertising opportunities is an entire commercial advertisement spot.

7. The media distribution platform of claim 2, wherein one of the first and second inventory allocation information comprises at least one of a duration of a respective one of the first and second available advertisement opportunities, a date and time during which the respective one of the first and second available advertisement opportunities is scheduled, a requested price associated with the respective one of the first and second available advertisement opportunities, and historical attribute information associated with programming content scheduled around the respective one of the first and second available advertisement opportunities.

8. The media distribution platform of claim 1, wherein:
at least one of the first and second advertising opportunities is an impression;
wherein the impression comprises a single instance of delivering an asset to a subscriber in a network subdivision during an advertisement break in programming;
a different asset is configured to be delivered to a different subscriber in the network subdivision during the same advertisement break in the programming; and
a determination to deliver the asset to the subscriber and not deliver the asset to the different subscriber is made independent of a network topology.

9. The media distribution platform of claim 1, wherein:
the data management platform is further operable to select a plurality of device IDs;
each of the plurality of device IDs is associated with an electronic device associated with one of the plurality of subscriber keys received from the first distribution network; and
the campaign target list comprises the plurality of device IDs usable for addressing delivery of the asset to each respective electronic device.

10. The media distribution platform of claim 1 wherein the consumer information comprises at least one of credit score, loyalty program membership, income, past purchase data, gender, occupation, social media activity, requests for information and age.

11. The media distribution platform of claim 1, wherein the media distribution platform is operable to receive reporting information from the first distribution network, said reporting information comprising at least one of affirmation that the asset was transmitted to at least one device associated with each selected subscriber, affirmation that the asset was displayed on said at least one device, and information indicating that each selected subscriber actively engaged said at least one device during display of the asset.

12. The media distribution platform of claim 1, further comprising:
a settlements module configured to calculate an account balance based upon received reporting information.

13. The media distribution platform of claim 1, further comprising:
an audit module configured to provide a third-party auditor access to auditing data associated with the media distribution platform, wherein said auditing data is anonymized to prevent unauthorized access to personally identifiable information.

14. The media distribution platform of claim 1, further comprising:
a programmatic buying extension configured to analyze consumer information from the data management platform and reporting information to estimate influence information associated with a non-targeted media asset.

15. The media distribution platform of claim 1, further comprising:
campaign optimization tools configured to analyze the campaign instructions and associated reporting information to formulate suggested campaign instructions.

16. The media distribution platform of claim 1, further comprising:
a creative distribution module configured to transmit the asset to the first distribution network.

17. A method of distributing an asset, comprising:
receiving, at a distribution network module of a media distribution platform, subscriber keys from a first distribution network, wherein each of the subscriber keys corresponds to a subscriber of a set of subscribers of the first distribution network, wherein said first distribution network distributes network content to subscribers independent of said media distribution platform;
receiving, at a data management platform of the media distribution platform, the subscriber keys from the distribution module;
identifying, at the data management platform, which subscribers of the set of subscribers are associated with each of a plurality of target attributes based upon consumer information;
receiving, at a front-end module of the media distribution platform, first inventory allocation information from a first inventory owner, said first inventory allocation information indicative of a first available advertising opportunity in programming content;
receiving, at the front-end module, second inventory allocation information from a second inventory owner, said second inventory allocation information indicative of a second available advertising opportunity in programming content;
providing, to an advertiser, a plurality of selectable targeting attributes via an advertiser interface;
receiving, from the advertiser, campaign instructions and an asset, wherein the campaign instructions comprise at least one selected targeting attribute selected from the plurality of selectable targeting attributes and a quantity of subscribers associated with the at least one selected targeting attribute;
transmitting, to the first distribution network, one or more insertion orders comprising the asset and a campaign target list including a number of said subscriber keys corresponding to selected subscribers associated with at least one target attribute which corresponds to the at least one selected targeting attribute, wherein said first distribution network employs said insertion orders to cause delivery of said asset to said selected subscribers in conjunction with said network content.

18. The method of claim 17, wherein:
the transmitting is performed by a creative distribution module of the media distribution platform, said creative distribution module being disposed at a location remote from the front-end module.

19. The method of claim 18, further comprising:
receiving reporting information from the first distribution network, said reporting information comprising at least one of affirmation that the asset was delivered to a first device associated with the insertion orders, affirmation that the asset was displayed on the first device, and information indicating that a user actively engaged the first device during display of the asset.

20. The method of claim 19, further comprising:
calculating, using a settlements module of the media distribution platform, an account balance associated with the advertiser based upon the reporting information.

21. The method of claim 20, further comprising:
providing an auditing interface to a third-party auditor, said auditing interface allowing access to at least one of the inventory allocation information, the reporting information, and the account balance.

22. The method of claim 21, further comprising:
analyzing, using a programmatic buying extension of the media distribution platform, the reporting information in conjunction with the campaign instructions and the consumer information to estimate an influence metric associated with a non-targeted asset.

23. The method of claim 22, further comprising:
analyzing, using campaign optimization tools of the media distribution platform, the campaign instructions and associated reporting information to generate suggested campaign instructions.

24. The method of claim 23, further comprising:
retrieving a plurality of device IDs associated with the plurality of subscriber keys from the data management platform, wherein the campaign target list comprises the plurality of device IDs.

25. The method of claim 24, wherein the consumer information comprises at least one of credit score, loyalty program membership, income, past purchase data, gender, occupation, social media activity, requests for information, and age.

26. A method of distributing a targeted media asset, comprising:
receiving first inventory allocation information from a cable distribution network at a front-end module of a media distribution platform, wherein said first inventory allocation information comprises details regarding a first available advertisement opportunity in a cable programming stream;
receiving second inventory allocation information from an internet service provider at the front-end module, wherein said second inventory allocation information comprises details regarding a second available advertisement opportunity in an online programming stream;
providing, to an advertiser, a plurality of selectable targeting attributes via an advertiser interface;
receiving, from the advertiser, campaign instructions and an asset, wherein the campaign instructions comprise at least one selected targeting attribute selected from the plurality of selectable targeting attributes and a quantity of subscribers associated with the at least one selected targeting attribute;
receiving, at the media distribution platform, a first subscriber key from the cable distribution network and a second subscriber key from the internet service provider, wherein the first subscriber key is associated with a first user of a service provided by the cable distribution network and the second subscriber key is associated with a second user of a service provided by the internet service provider, wherein said cable distribution network and said internet service provider respectively distribute said cable programming stream and said online programming stream independent of said media distribution platform;
identifying, at the media distribution platform, the first and second users as desired targets for the asset based upon the campaign instructions and consumer information associated with the first and second subscriber keys;

transmitting, from the media distribution platform to the cable distribution network, the asset and the first subscriber key associated with a cable device used by the first user, wherein the first subscriber key is associated with a first device ID; and transmitting, from the media distribution platform to the internet service provider, the asset and said second subscriber key associated with an internet-enabled device used by the second user, wherein the subscriber key is associated with a second device ID;

wherein said cable distribution network employs said first device ID to cause delivery of said asset to said first user in conjunction with said cable programming stream and said internet service provider employs said second user ID to cause delivery of said asset to said second user in conjunction with said online programming stream.

27. The method of claim 26, wherein the first user is the second user and the first subscriber key is the second subscriber key.

28. The method of claim 26, wherein the first user is different than the second user and the first subscriber key is different than the second subscriber key.

29. The method of claim 27 or 28, wherein the cable distribution network is the internet service provider.

30. The method of claim 27 or 28, wherein the cable distribution network is different than the internet service provider.

31. The method of claim 26, wherein the cable programming stream comprises first television content and the online programming stream comprises the first television content time synchronized with the cable programming stream.

* * * * *